United States Patent [19]

Rabinovich

[11] 4,294,378

[45] Oct. 13, 1981

[54] SAFETY HATCH COVER APPARATUS

[75] Inventor: Evsey Rabinovich, Erie, Pa.

[73] Assignee: Emco Wheaton Inc., Conneaut, Ohio

[21] Appl. No.: 118,647

[22] Filed: Feb. 4, 1980

[51] Int. Cl.³ .............................................. B65D 45/28
[52] U.S. Cl. .................................. 220/323; 220/314; 220/203; 105/377
[58] Field of Search ............... 220/314, 323, 203, 206, 220/324; 292/251.5; 105/377; 137/43, 493

[56] References Cited

U.S. PATENT DOCUMENTS

| | | | |
|---|---|---|---|
| 2,793,787 | 5/1957 | Lescure | 220/323 |
| 3,268,254 | 8/1966 | Vantrola et al. | 220/314 X |
| 4,132,327 | 1/1979 | Van Dyke et al. | 220/323 X |
| 4,181,238 | 1/1980 | Arnold et al. | 220/314 |

Primary Examiner—George T. Hall
Attorney, Agent, or Firm—Pearne, Gordon, Sessions, McCoy & Granger

[57] ABSTRACT

Discloses is a safety hatch cover apparatus illustrated as used on a tank of a tank-carrying vehicle such as a gasoline truck. The apparatus comprises a base member attached to the tank and having an opening adapted to be closed by a hatch cover hinged to the base member. The hatch cover carries a latch bar rotatable about an axis perpendicular to the base member and adapted to engage keeper members fixed to the base member adjacent the hatch opening. The latch bar carries a cam which turns with the longitudinal axis of the latch bar and engages biasing means carried by the cover. The biasing means, cam, latch bar and keeper members cooperate to close the cover yet permit the cover to lift in case of excess gas pressure in the tank. The apparatus also includes safety means adapted to engage the latch bar to restrain it from moving from its position in which it engages the keeper members, whether or not the cam is turned to cause the latch bar to be in locked position.

14 Claims, 10 Drawing Figures

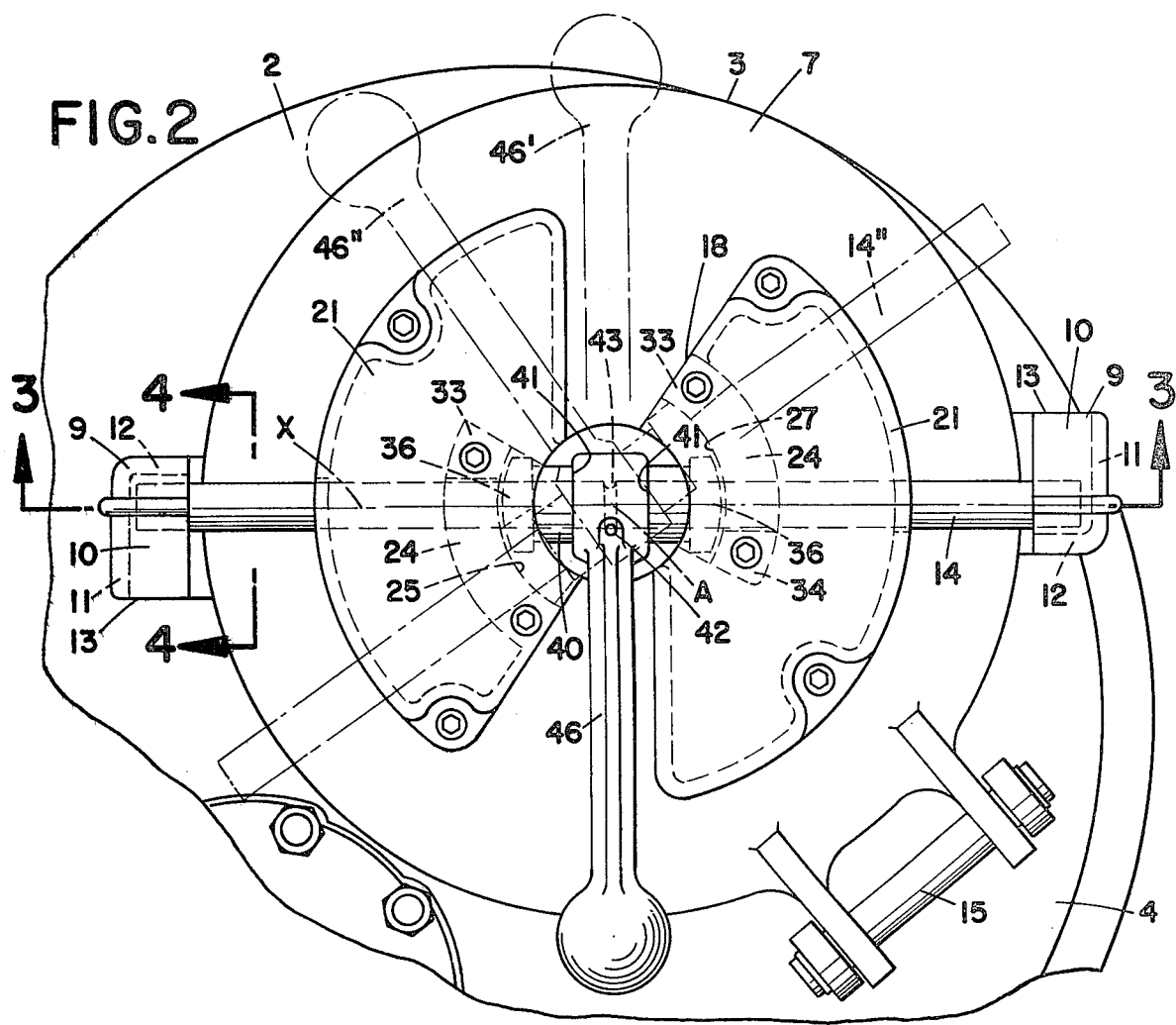
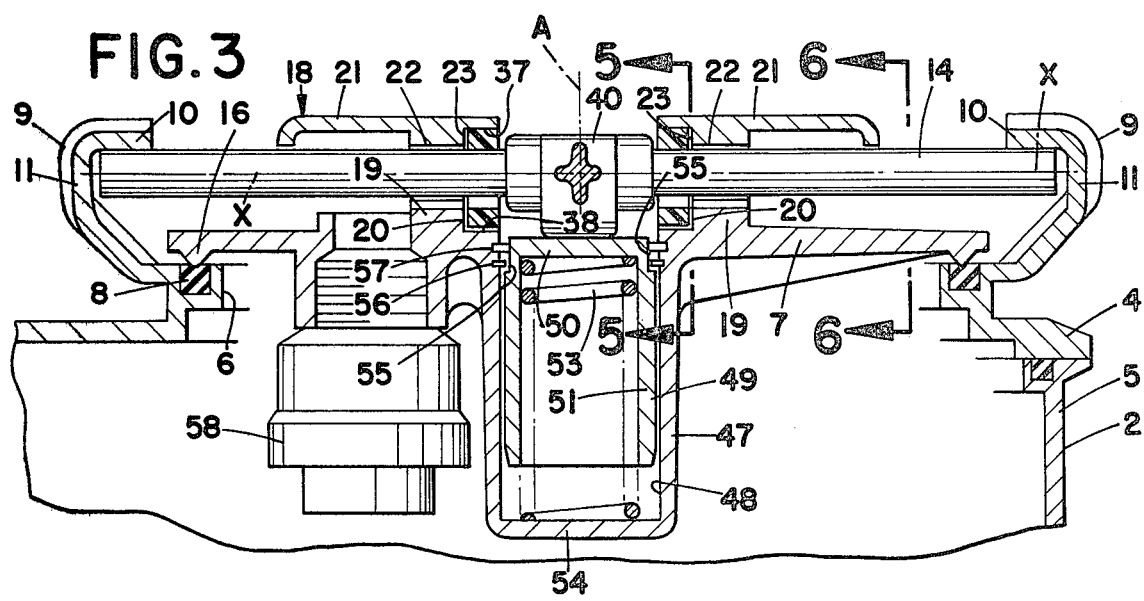

SAFETY HATCH COVER APPARATUS

BACKGROUND OF THE INVENTION

This invention relates to safety hatch cover apparatus, and more particularly to such apparatus permitting controlled venting of pressurized gas from a container closed by the hatch cover and having locking means which provide increased safety in locking the hatch cover in its closed position and unlocking it from its closed position.

The invention has particular application as hatch cover apparatus at the top of a tank of a highway tank truck or tank trailer vehicle adapted to contain vaporizable or flammable liquids such as gasoline. Therefore, the invention will be discussed below largely in connection with such use.

United States and state regulations require that the upper part of the tank of such a vehicle, such as a tank dome in which the hatch cover apparatus may be installed, be capable of adequately venting the tank to protect it from the effects of excessive superatmosphere and subatmospheric pressures. In conventional practice, the tank dome usually includes pressure vapor valve means which permits venting of gas from the tank or entrance of air into the tank. Generally, such a valve is designed so that if the tank overturns the valve shuts completely off. The tank dome also usually has a fusible plug to release gas or liquids from the tank in the event that the tank is exposed to excessive temperatures as from fire. Other valves may be provided for other purposes.

A hatch opening is provided, preferably in the dome, to allow access to the tank interior by personnel for inspection, cleaning or repair, or for use in filling the tank, and a hatch cover is provided to open and close the opening. Means are provided to lock the cover closed. It is necessary, however, even though the hatch cover be locked closed, if internal pressure exceeds a predetermined amount, that there be venting from the tank. It is also necessary that the hatch cover apparatus provide safety by preventing the hatch cover from opening due to vibration during travel of the vehicle carrying the tank, and also to provide safety for an operator in opening the hatch cover in the event of substantial gas pressure in the tank at the time of opening. It is also desirable that the hatch cover apparatus and its locking mechanism be of strong construction and simple in operation.

In general, prior apparatus has not provided all of these necessary or desirable features. U.S. Pat. No. 4,024,983 provides a hatch cover construction for a tank having locking means embodying on the cover a latch bar that is rotatable about an axis normal to the cover and that when in locking position has its ends engaged with keepers mounted on a base member connected to the tank dome and providing the hatch opening; the keepers are movable and spring loaded so they can move outwardly to allow the cover to rise to permit venting of excessive gas pressure. This patent discloses no safety features restraining inadvertent rotation of the latch bar to release the hatch cover. Its apparatus is susceptible to malfunctioning because its springs are exposed to the contents of the tank. In addition, the keepers are movable and guided by the shaft which is sealed with rubber O-rings, which could be a potential source of malfunctioning.

U.S. Pat. No. 2,093,694 discloses a hatch cover construction for a tank, having a latch bar rotatable about an axis normal to the cover and engaging keepers and having elements inside of the tank enclosure which are claimed to prevent inadvertent rotation of the latch bar. However, the structure is very different from that of the present invention. It is complicated, more expensive and more liable to get out of order, particularly because of exposure of most of the structure to the contents of the tank.

U.S. Pat. No. 3,744,670 discloses a different type of hatch cover construction not embodying a rotatable latch bar but, rather, transverse bars that hold the cover down and a spring-loaded arrangement operating between the cover and one of the transverse bars that urges the cover downwardly but allows it to rise to permit venting. The structure is very different from that of the present invention and considerably more complicated and expensive to manufacture; it also lacks the safety features of the invention.

It is an object of the invention to provide all or as many as desired of the desirable factors indicated above, and to overcome the deficiencies of the prior art.

It is a further object to provide safety features to prevent the hatch cover from unlocking during travel of the vehicle over the road, and to provide safety for the operator on the opening of the hatch cover in the event that there is substantial gas pressure in the tank.

In accordance with these objects, the invention provides hatch cover apparatus for a tank comprising a base member fixed to the tank and having an opening providing access to the tank; a pair of keeper members rigidly fixed to the base member at opposite sides of the opening, each keeper member providing lateral access for an end of a latch bar; a cover associated with the base member and adapted to be put in closed position to engage the base member and close the opening and to be put in opened position to open the opening; an elongated latch bar adapted to have its ends engaged with the keeper members when the cover is in its closed position and to be disengaged from the keeper members when the cover is in opened position; means on the cover for mounting the latch bar on the cover so that it has clearance in the direction perpendicular to the cover and is capable of limited twisting or transverse movement relative to the cover to engage and disengage the keeper members and of rotation about its longitudinal axis, said latch bar being thus rotatable in the plane of the cover between a position in which its ends are engaged with the keeper member and another position in which its ends are not so engaged; a cam adapted to be rotated about the longitudinal axis of the latch bar with projecting external surface portions that are located a maximum distance from the latch bar axis toward the cover when the cover is in its closed position and retracted external surface portion means located a lesser distance from said latch bar axis and away from the cover when said cover is not in its closed position; resilient biasing means operating by cooperation of the cover, the latch bar, the cam and the keeper to urge the cover toward the base when the cover is closed and the latch bar ends are engaged with the keepers, whereby gas pressure above a predetermined amount within the tank and urging outwardly on said cover against the biasing force of the biasing means will cause at least a portion of the cover to lift from the base and permit escape of gas from the tank; and, preferably, means cooperating between the latch bar mounting means and the latch bar and located outside of the containers to restrain the latch bar from moving from the position where its ends are engaged with the keeper means to a position where it might open.

According to another aspect of the invention, the means for restraining the latch bar also operates to restrain the latch bar from moving from its position where its ends are engaged with the keeper means even though the cam means is turned about the axis of said latch bar so that its projecting surface portion means does not engage said resiliently biased means.

BRIEF DESCRIPTION OF THE DRAWINGS

These and other objects, features and advantages of the invention will become apparent from the following description of a preferred embodiment thereof in connection with the following drawings, in which:

FIG. 2 is a plan to a larger scale of the hatch cover apparatus of the invention, showing in full lines the position of the latch bar and the operating handle when the hatch cover is closed and showing in broken lines a position of the handle when the cover is unlocked and about to be opened and a third portion in which the handle has been turned to release the latch bar from the keeper means so that the cover can be opened;

FIG. 3 is a section along line 3—3 of FIG. 2 of the hatch cover apparatus of the invention, showing the hatch cover in closed and locked and closed position;

DESCRIPTION OF THE PREFERRED EMBODIMENT

Figure 1:
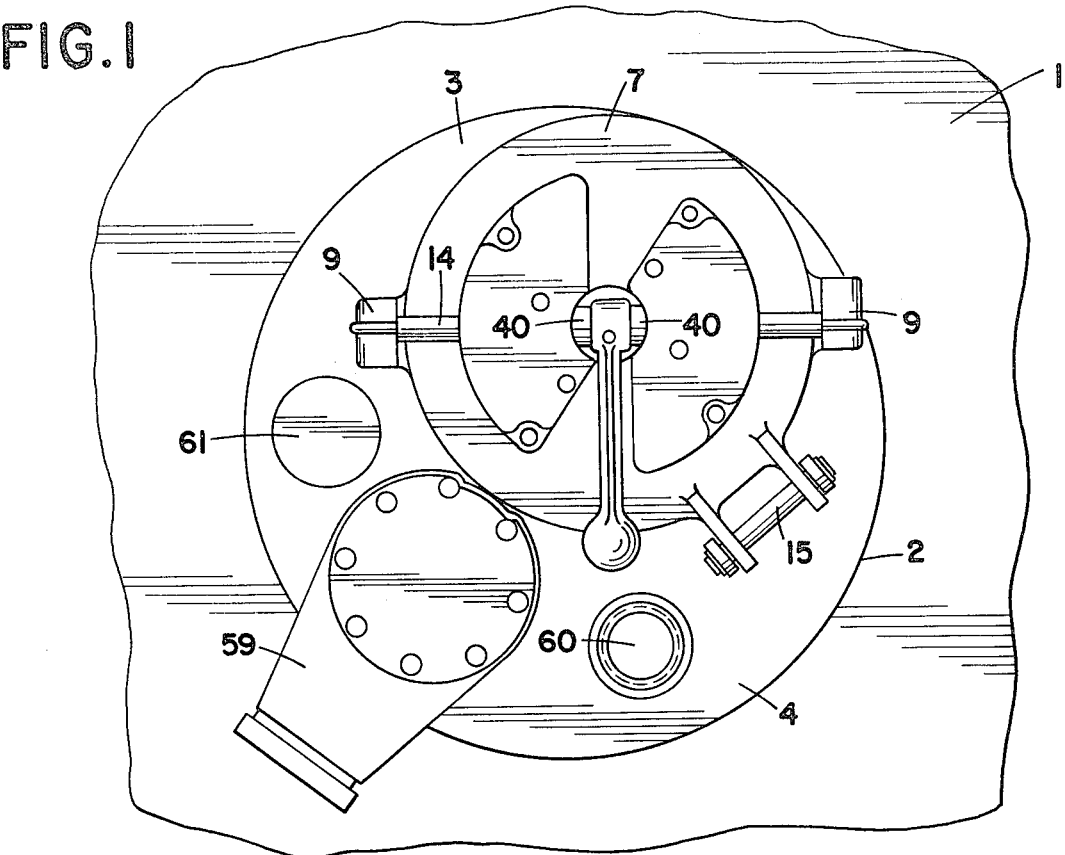
FIG. 1 is a plan of a tank dome of a tank of a tank-carrying vehicle, which tank dome embodies the hatch cover apparatus of the present invention.

In the drawings, the tank 1, which may be the tank of over-the-road vehicles such as a gasoline truck, has a dome 2. The top of the dome carries hatch cover apparatus 3 embodying the invention. The tank or container 1 is filled with flammable liquids such as gasoline and generally is mounted on wheels and pulled by a tractor truck. The hatch cover of this invention, however, could have application to stationary tanks or containers.

Figure 4:
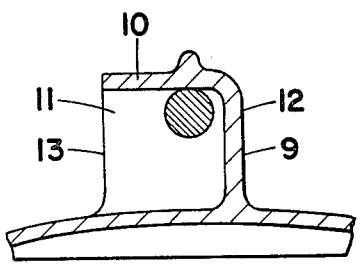
FIG. 4 is a section along line 4—4 of FIG. 2, to the same scale, of one of the keeper means.
Figure 5:
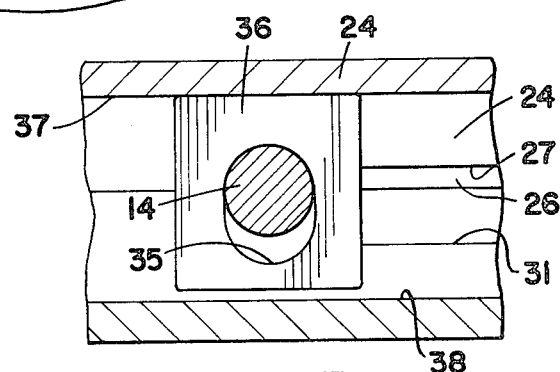
FIG. 5 is a section along line 5—5 of FIG. 3, a larger scale.

The hatch cover apparatus (FIGS. 3, 7, 8, 10) comprises a base member 4 rigidly secured in gastight relation to the upper edge of the circular cross sectioned wall 5 of the dome 2, by suitable means (not shown) as is well-known in the art. Base member 4 has a circular opening 6 of substantial diameter which provides access to the interior of tank 1 and which is adapted to be closed and opened by a cover 7. Opening 6 is surrounded by an upwardly or outwardly facing circular sealing ring 8 of resilient material resistant to the materials carried in the tank. The base member also rigidly supports two upwardly or outwardly extending diametrically opposed keeper members 9, each of which (FIG. 4) includes a top wall 10 supported by a side wall 11 and a rear wall 12, and has a side opening or cavity 13 permitting lateral entrance of an end of a latch bar as described later. The openings face in opposite directions to permit the outer ends of a latch bar 14 mounted on the cover to enter and leave the keeper members, upon twisting or rotation of the latch bar about the center of the cover and an axis normal to its longitudinal axis.

A cover 7, which is mounted on the base member by a hinge portion 15, may be put in closed locked position as shown in FIGS. 2 and 3. After it is unlocked, it may then be swung back on hinge portion 15 to open the hatch opening 6. At its outer edge, the cover has a downwardly or inwardly projecting annular ridge 16 adapted to bear against the sealing ring 8 in the base member to form a gastight seal when the cover is in the closed locked position shown in FIGS. 2 and 3. The cover and base member openings are preferably circular, but could be square or rectangular or of other configuration.

On its upper and outer side, the cover carries the transversely extending latch bar 14 by mounting means 18 so that the bar has some clearance in the direction perpendicular to the cover, and is capable of limited twisting or transverse movement relative to the cover about an axis A (FIG. 3) that is normal to the longitudinal axis X of the latch bar and that is essentially fixed relative to and extending transversely of, and preferably normal to, the cover. Axis A is substantially coincident with an axis extending through the center of the circular hatch opening 6 when the cover is in closed locked position.

In the embodiment illustrated, latch bar mounting means 18 (FIG. 3) comprises two upstanding wall portions 19 preferably formed integrally with the cover. Each upstanding wall portion 19 extends upwardly and outwardly from the cover and has an inner upright wall surface 20 forming part of a cylindrical arc about axis A. Each wall portion 19 has a top shield or protective portion 21 which may be bolted to it. Protective portions 21 respectively have downwardly extending wall portions 22 having arcuate wall surfaces 23 shaped to match arcuate surfaces 20 of wall portions 19; wall portions 19 and 23 respectively form complete walls 24 each with an arcuate surface 25 formed of a pair of matching arcuate surfaces 20 and 23 adapted to receive a bearing as will be hereinafter described.

Each complete arcuate wall 24 (FIGS. 2, 3, 6, 9) has a laterally extending slot 26 (FIG. 6) slightly larger than the diameter of latch bar 14, and having a top edge 27 with a notch 28 for a purpose to be described, and a lower edge 31 with a notch 32 for a purpose to be described. Each slot 26 has its ends closed portions 33 and 34 of the arcuate walls 24.

The slots 26 thus provide restricted clearance for the latch bar, enough to permit it to be twisted in and out of engagement with the keeper means.

Latch bar 14 extends through the slots 26 of walls 24, and also through elongated openings 35 of bearing members 36 (FIG. 3, 5), may be made of metal or suitable wear-resistant synthetic resin material. The openings are elongated in a direction which is perpendicular to the plane of the cover and accommodate the movement of the latch bar as the cam is engaged and disengaged. Each bearing member 36 fits in a recess defined by the arcuate surface 25 of a wall 24 and upper and lower laterally extending surfaces 37 and 38 adjacent the wall 24. The surface of the bearing member facing away from the axis A is curved to fit slidably against the arcuate surface of its associated wall 24; the top and bottom edges of the bearing member slidably fit surfaces 37 and 38; the surface of the bearing member facing axis A preferably flat.

Latch bar 14 also extends through a cam member 40 to which it is affixed. It is secured against movement axially of the bar axis by the side portions 41 of the cam member which bear against the bearing members 36; the cam member is rotatable on the latch bar, but secured against axial movement by a pin 42 extending through the cam member to engage an annular groove 43 in the outer surface of the latch bar.

The outer surface of the cam member is shaped so that it has a projecting portion 44 (FIGS. 7, 8, 9) that extends a substantial distance away from the axis X of the latch bar and a retracted portion 45 constituting most of the periphery of the cam surface that is substantially closer to the axis of the latch bar.

A handle 46 is rigidly fixed to the cam member and extends transversely of, and preferably at a right angle to, the latch bar. The handle is so related to the external surface of the cam member that when the handle is turned about latch bar axis X to one side of the mounting means 18 as shown in full line in FIG. 2, it is substantially parallel to the cover 7 (FIGS. 1 and 2), and the projecting portion 44 of the cam member extends downwardly toward the cover, whereas when the handle is turned approximately 180° to the other side of the mounting means 18, as shown in broken lines 46 in FIG. 2, so it is substantially parallel to the cover, the projecting portion 44 faces away from the cover and the retracted portion 45 faces toward the cover.

Cover 7 includes a downwardly extending housing portion 47 that is rigidly fixed gastight to the underside of the cover, being preferably integral with the cover as shown.

Housing portion 47 is illustrated as having a generally internal cylindrical wall 48 essentially coaxial about axis A. A generally cylindrical piston-type element 49, having a top wall 50 and side wall 51, is mounted in housing portion 47 to slide along its inner wall.

Member 49 is biased outwardly and upwardly relatively to cover 7 by a compression-type spring 53 bearing against the underside of the wall 50 of member 49 and the bottom 54 of housing portion 47. The upper portion 55 of member 49 is of reduced external diameter to provide a horizontally extending, upwardly facing shoulder 55 adapted to engage a stop member 56 projecting from inner wall 48 of housing portion 47 to limit upward and outward movement of member 49 relatively to the cover. A known sealing ring 57 is also mounted to project from wall 48 to contact the outer portion 54 of member 49 to prevent access of rain, dust or other harmful contaminants into the space between housing 47 and member 49. This arrangement thus acts as a resilient biasing means to urge the cover toward the base means when the cover is closed and permit the cover to lift from the base means and let gas or vapors escape when certain pressures are reached as is hereinafter described.

Therefore, when the ends of the latch bar 14 are engaged within the keeper members 9 and the cam member 40 is turned by handle 46 so its projecting portion extends downwardly toward and engages the member 49 to cause the ends of the latch bar to tightly engage the keeper members 9, as shown in FIG. 3, the latch bar is in locked position and holds the cover locked closed. When handle 46 is turned approximately 180 degrees to position 46' to cause the projecting portion of the cam to face away from member 49, the ends of the latch bar are loosened from tight engagement with the keeper members and the latch bar can then be turned about the axis A by handle 46 to the position indicated by broken lines 46" to remove its ends from the keeper members to permit the cover to be swung to opened position about hinge portion 15. Handle 46 will be engaged with a latch leaf spring 59 when moved in the 46" position which retains the handle 46" in its position during the opening of the cover 7. The bearing members 3b slide along the matching arcuate surfaces 20 and 23 when the handle is twisted for this purpose. Once the handle has been rotated to the position 46" indicated by broken lines, underneath the protective portion 21, it may be engaged by a latch leaf spring or the like on the protective portion to retain it thereunder when the cover 7 is opened.

The illustrated apparatus also embodies safety means for restraining inadvertent or undesired movement of the latch bar about axis A after the cam member has been turned and the latch bar is the cover locking position shown in FIG. 3, and also for restraining movement of the latch bar about the axis A to prevent inadvertent disengagement of its ends from keeper members 9 when the cam member is turned so that its retracted portion is facing member 49.

Figure 9:
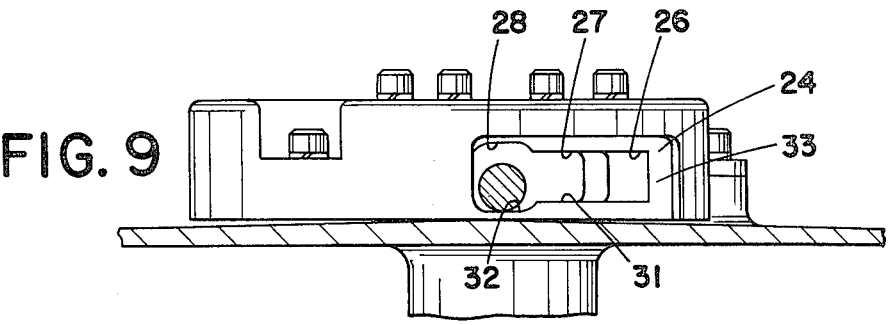
FIG. 9 is a section along line 9—9 of FIG. 8, to the same scale.
Figure 10:
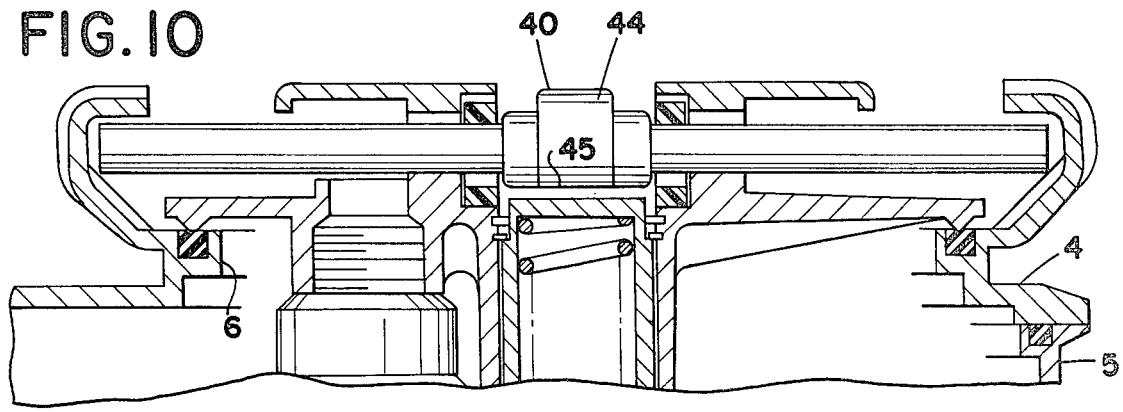
FIG. 10 is a section similar to that of FIG. 8, after gas venting has ceased and the latch bar can be readily rotated to complete unlocking and opening of the cover.

Such means in the illustrated embodiment comprises the notches 28 and 32 in the upper or outward and lower or inward edge of slots 26 and at the end thereof. The upper notches 28 are located so that the latch bar can seat in both such notches when the ends are engaged in the keeper members 9. Notches 32 are located directly opposite upper notches 28. The latch bar seats in notches 32 when the cam member is turned so its retracted portion faces member 49 (FIG. 9). The latch bar seats in notches 28 when the cam member is turned to the locked position (FIG. 3).

The apparatus also includes a known valve 58 mounted in the cover for permitting venting of gases from the tank or entrance of air into the tank because of atmospheric pressure changes. A known valve 59 for collecting and recovering of vapors of the liquid, such as gasoline, being introduced into the tank, is located in the tank dome of the illustrated apparatus. A known drain and fuse plug 60 and level indicator 61 for indicating the level of liquid in the tank are also mounted in the tank dome.

Operation of the illustrated hatch cover apparatus is as follows, assuming that initially the parts are arranged as shown in FIGS. 2 and 3, the cover 7 being closed, the latch bar 14 turned by handle 46 about axis A so that its ends are engaged by the keeper members 9 fixed to the base member, and the cam member 40 turned by the handle so that the projecting portion 44 of the periphery of the cam member is engaged with and depresses the spring-biased member 49 relatively to the cover. The cover is thus hed tightly closed by force of the spring on member 49, which presses against the projecting portion of the cam member 40; the can member, acting on the latch bar 14, causes the ends of the latch bar to tightly engage the keeper members, as shown in FIG. 3.

Figure 7:
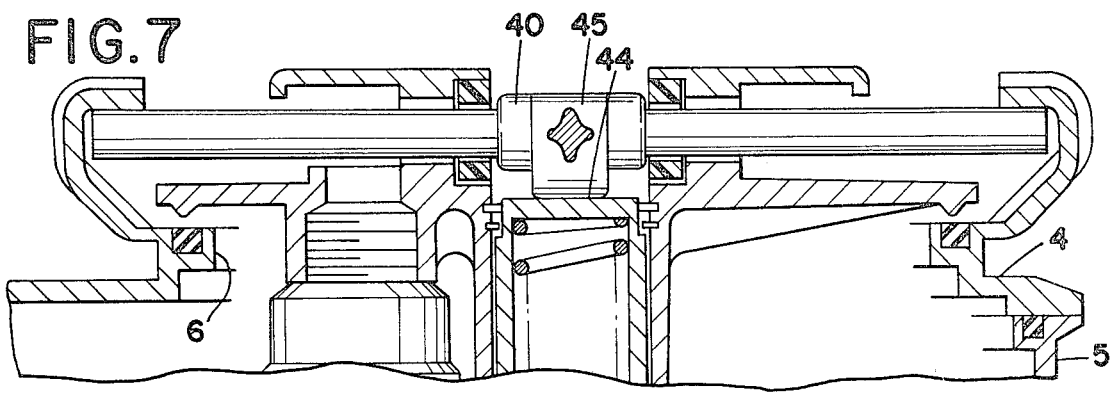
FIG. 7 is a section similar to that of FIG. 3, showing the bar and hatch cover in locked position, bar showing the hatch cover raised due to pressure of gas in the enclosure, to permit venting of gas.

Then, in the event of pressure in the tank in excess of a predetermined amount of pressure determined the force developed by spring 53, usually about 3 to 5 pounds pressure, the force exerted by the gas pressure on the cover 7 will cause the cover to rise so its annular sealing ridge 17 lifts off the resilient sealing ring 8 of the base member and permits venting of the gas from the tank, as shown in FIG. 7. In this disclosure, I use the term "gas" to include vapors from the liquid in the tank, for practical purposes, gasoline vapors.

Figure 6:
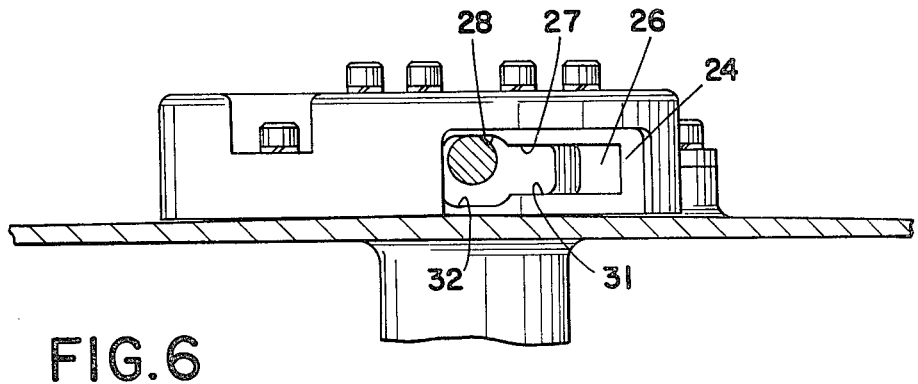
FIG. 6 is a section along line 6—6 of FIG. 3, to the same scale.

The safety features described above restrain the latch bar 14 from inadvertent or undesired turning about axis A out of engagement with the keeper members when the latch bar 14 and cam members are positioned as shown in FIG. 3 or FIG. 7, since the latch bar is located in the upper notches 28 of slots 26 of mounting means 19, as shown in FIG. 6.

Figure 8:
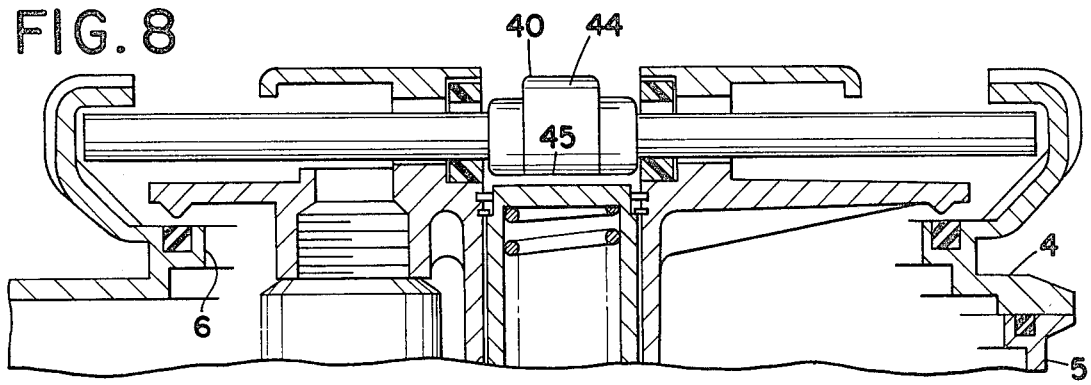
FIG. 8 is a section similar to FIG. 3, but showing the arrangement of the parts when the handle and cam portion have been turned so that the projecting portion of the cam does not engage the resiliently biasing means, the latch bar is still engaged with the keeper means, the cover has lifted to permit a venting of gas from the tank, and the latch bar is in the lower slots to restrain latch bar rotation.

Moreover, the safety features described above provide additional safety for the operator when the hatch cover is being opened, particularly if there is residual gas pressure in the tank at the time of opening. Thus, when the handle 46 is turned approximately 180 degrees about the axis X of the latch bar to cause the projecting portion of the cam portion 40 to face away from the biased member 49 and the retracted portion of the cam portion to face toward member 49, in the event of gas pressure in the tank the cover 7 will lift and cause the latch bar 14 to seat by gravity in the lower notches 32 of slots 26 and thus be restrained from turning about axis A to an opening position. The conditions then are as illustrated in FIGS. 8 and 9. Substantial manual force would then be required to move handle 46 to position 46" to open the cover.

After the tank gas pressure has been relieved and the cover has become seated on the sealing member 8 of the base member, arm 46 can be readily moved to turn the latch bar about the axis A to remove the ends of the latch bar 14 out and away from the keeper members to the position 14", shown in broken lines in FIG. 2, so that the hatch cover then can be readily opened.

These features greatly increase safety by preventing accidental or inadvertent opening of the cover during travel of the vehicle, or by an operator, since it would be very difficult, if not impossible, to turn the latch bar about axis A until all superatmospheric pressure in the tank is relieved.

In place of the resilient biasing means shown, it would be possible to substitute a leaf spring or a Belleville-type spring arrangement to operate between the cover 7 and the cam member 40, in place of the structure comprising housing portion 47, biased member 40, and spring 53.

While the invention has been shown and described in connection with a specific embodiment thereof, this is intended for the purpose of illustration rather than limitation, and other modifications and variations in the embodiment herein shown and described and other embodiments of the invention will be apparent to those skilled in the art, all within the intended scope of the invention. Accordingly, the patent is not to be limited to the specific embodiment herein shown and described nor in any other way that is inconsistent with the extent to which the progress of the art has been advanced by the invention.

What is claimed is:

1. Hatch cover apparatus for a tank comprising a base member fixed to the tank having an opening providing access to the tank; a pair of keeper members mounted on the base member at opposite sides of said opening, each keeper member providing lateral access for an end portion of a latch bar; a cover associated with the base member and adapted to be put in closed position to engage the base member and close the opening and to be put in opened position to open the opening; an elongated latch bar adapted to have its ends engage with the keeper members when the cover is in closed position and be disengaged from the keeper members when the cover is in opened position; means on the cover for mounting a latch bar on the cover so that it is capable of limited movement to engage and disengage from said keeper members and of rotation about its longitudinal axis, said latch bar being thus movable between a position in which its ends are engaged with the keeper members and another position in which its ends are not so engaged; a cam affixed to the latch bar and adapted to be rotated about the longitudinal axis of the latch bar, said cam having a projecting external surface portion that is located a maximum distance from the latch bar axis and toward the cover when the cover is in its closed position and retracted external surface portion located at lesser distance from the latch bar axis and away from the cover when the cover is not in the closed position; resilient biasing means operating by cooperation with the cover, the cam, the latch bar, and the keeper members to urge the cover toward the base member when the cover is closed and the latch bar ends are engaged with the keeper members, yet when gas pressure above a predetermined amount exists within the receptacle and generates a force on said cover against the biasing force of said biasing means, said biasing means will permit at least a portion of the cover to lift from the base member and permit escape of such gas from the tank.

2. The apparatus of claim 1 in which the biasing means comprises a coil spring which is confined in a cylindrical housing integral with the cover and which acts against a piston-like element movable in said housing and which in turn engages the cam affixed to the latch bar.

3. The apparatus of claim 1 in which the latch bar is mounted in bearings on each side of the cam which are restrained by and slideable with the latch bar mounting means.

4. The apparatus of claim 3 in which the bearings are provided with elongated openings to accommodate the inward and outward movement of the latch bar as it is engaged with and disengaged from the biasing means.

5. The apparatus of claim 1 in which said last-mentioned means operates to restrain the latch bar from moving from its position where its ends are engaged with the keeper members, when the cam means is turned about the axis of the latch bar so that its projecting surface portion means engages said biasing means.

6. The apparatus of either of claims 1 or 2 in which said means cooperating between the latch bar mounting means and the latch bar and located outside of the receptacle to restrain the latch bar, operates to restrain it from moving from its position where its ends are engaged with the keeper members even though the cam means is turned about the axis of said latch bar so its projecting surface means does not engage said biasing means.

7. Hatch cover apparatus for a container comprising base means fixed to the container and having an opening providing access to said container; a pair of keeper means rigidly fixed to the base means at opposite sides of the opening, each keeper means providing lateral access for an end of a latch bar; a cover associated with the base means and adapted to be put in closed position to engage the base means and close the opening and to be put in opened position to open the opening; an elongated latch bar adapted to have its ends engage with the keeper means when the cover is in its closed position and to be disengaged from the keeper means when the cover is in its opened position; means on the cover for mounting the latch bar on said cover so that it is substantially immovable axially of the latch bar relative to the cover but capable of limited movement transversely relative to the cover and of rotation relative to the cover about an axis normal to the longitudinal axis of the latch bar and essentially fixed relatively to and extending transversely of the cover, said latch bar being thus rotatable between a position in which its ends are engaged with the keeper means and another position in which its ends are not so engaged; cam means located about and adapted to be rotated about the latch bar axis, said cam means having projecting external surface portion means that is located a maximum distance from the latch bar axis and toward the cover when the cover is in its closed position and retracted external surface portion means located a lesser distance from the latch bar axis when the cover is not in closed locked position; resilient biasing means supported in gastight relation by said cover and exerting a resilient biasing force inwardly on the cover when the cover is closed and the latch bar ends are engaged with the keeper means, but when pressure above a predetermined amounts exists within the container and urges said cover outwardly against the biasing force of said biasing means, said biasing means will permit at least a portion of the cover to lift from the base means and permit escape of gas from the container.

8. Apparatus of claim 7 comprising means located outside of said receptable and cooperating between said latch bar mounting means and said latch bar to restrain the latch bar from moving from the position where its ends are engaged with the keeper means.

9. The apparatus of claim 8 in which said means cooperating between the latch bar mounting means and the latch bar operates to restrain the latch bar from moving from where its ends are engaged with the keeper means when the cam means is turned about the axis of the latch bar so that its projecting surface portion engages said biasing means.

10. Apparatus of either of claims 7 or 8 in which said means cooperating between the latch bar and mounting means and the latch bar and located outside the receptacle to restrain the latch bar operates to restrain the latch bar from moving from its position where its ends are engaged with the keeper means even though the cam means is turned about the axis of said latch bar so its projecting surface means does not engage said biasing means.

11. Apparatus of either of claims 9 or 10 in which said means are notches.

12. Hatch cover apparatus for a tank comprising a base member fixed to the tank with an opening for access to the tank, a latch bar, a pair of keeper members extending outwardly from the base member at opposite sides of the opening, each keeper member having a lateral cavity formed therein to receive an end of said latch bar and restrain it from outward movement, a cam affixed to the middle of the latch bar, bearings on each side of the cam to support the latch bar and permit it to rotate about its longitudinal axis, two upstanding wall portions which are integral with the cover and which have guideways formed therein to receive said bearings and permit them to move in the plane of the cover enough distance to free the ends of the latch bar from the keeper members and which also have lateral slots therein to permit such movement of the latch bar, a handle on the latch bar, a cylindrical housing integral with the cover and inward of the cam, a coil spring disposed in said housing, a piston in the housing between the cam and the spring so that when the ends of the latch bar are in the lateral cavities in the keeper members and when the cam is turned about its axis, it bears down on said piston and depressed said coil spring to keep the cover in a sealing engagement with the base means, but when a predetermined amount of pressure builds up within the tank and acts upon said cover, the cover lifts from the base member and causes said piston to depress said coil spring still further.

13. The apparatus of claim 12 in which there are notches at the end of the inward surface of the slots in the upstanding wall portions which receive the latch bar and when the cam is not bearing on the piston help prevent the ends of the latch bar from twisting out from the cavities in the keeper members.

14. The apparatus of claim 12 in which there are notches at the end of the outward surface of the slots in the upstanding wall portions which receive the latch bar when the cam is bearing on the piston and help prevent the ends of the latch bar from twisting out from the cavities in the keeper members.

* * * * *